April 6, 1965

W. HOBBS, JR 3,176,926

FEED HANDLING APPARATUS

Filed Nov. 12, 1963

INVENTOR.
WILLIAM HOBBS, JR.
BY
ATTORNEY

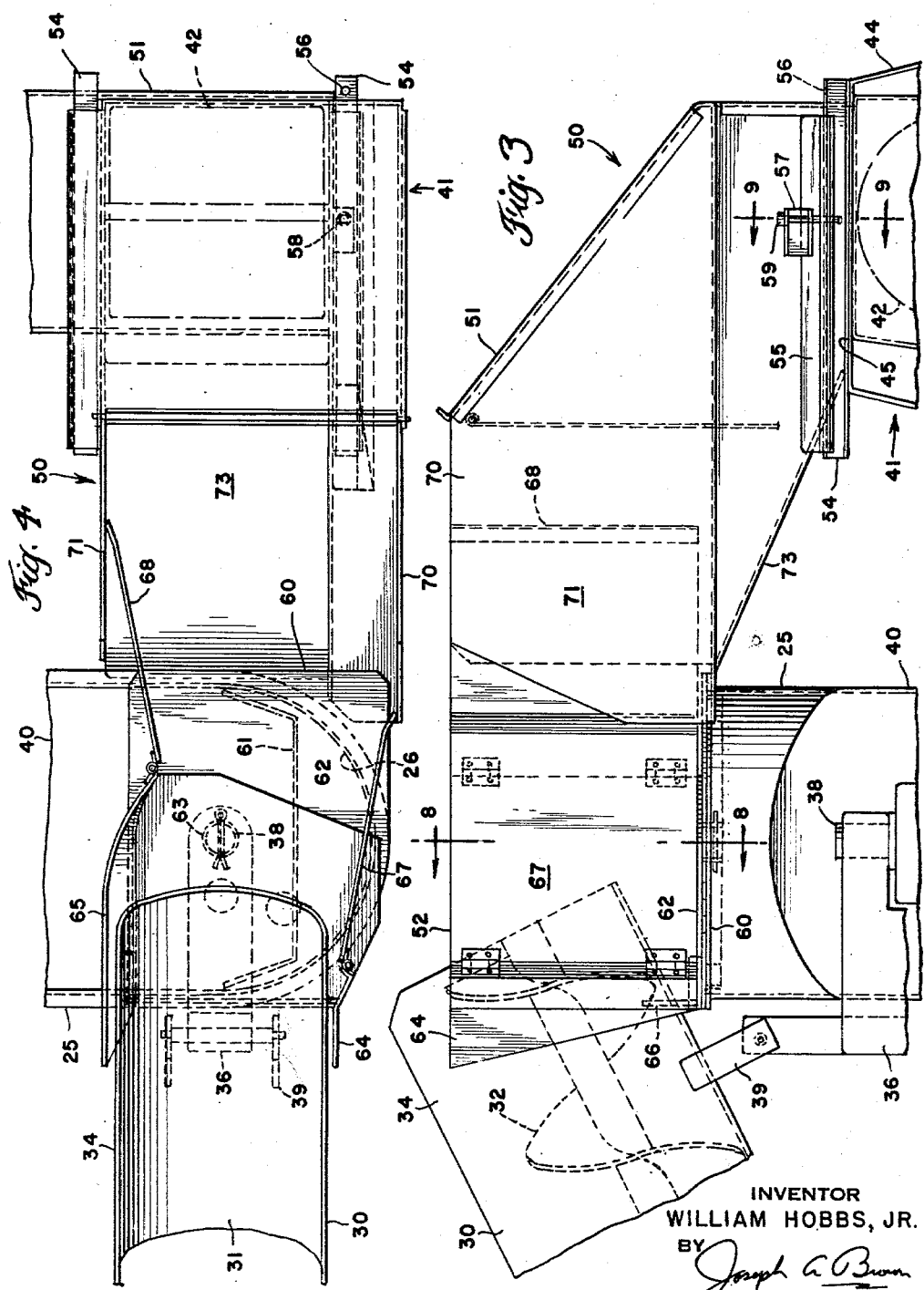

April 6, 1965 W. HOBBS, JR 3,176,926
FEED HANDLING APPARATUS
Filed Nov. 12, 1963 3 Sheets-Sheet 3
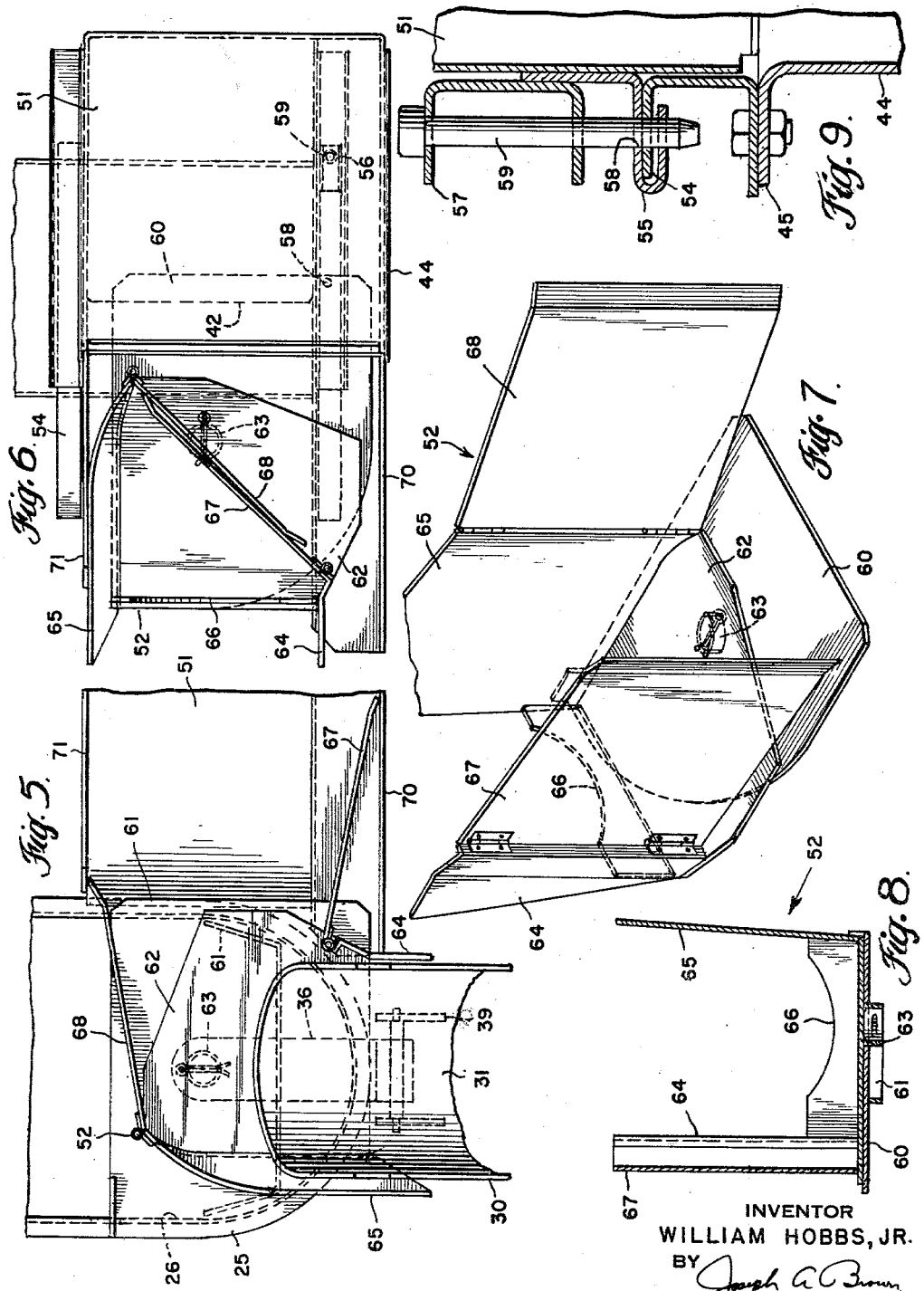
INVENTOR
WILLIAM HOBBS, JR.
BY
ATTORNEY United States Patent Office 3,176,926
Patented Apr. 6, 1965

3,176,926
FEED HANDLING APPARATUS
William Hobbs, Jr., Lancaster, Pa., assignor to Sperry Rand Corporation, New Holland, Pa., a corporation of Delaware
Filed Nov. 12, 1963, Ser. No. 322,974
10 Claims. (Cl. 241—101)

This invention relates generally to feed handling apparatus and more particularly to a machine for grinding, processing and mixing feeds.

Heretofore, a machine has been provided comprising a mobile frame on which a mixing tank is mounted and extending vertically. A hammermill is carried on the frame and provided with a hopper to receive feed material. Different types of feed may be dumped into the hopper and chopped as they pass through the hammermill. The resulting product is deposited in an auger conveyor which transports the material to the mixing tank. An auger within the mixing tank elevates the material and circulates it to produce a well mixed homogeneous mass. For supplying the hammermill hopper, a feed conveyor is employed and mounted on the machine frame for lateral swinging movement relative thereto. In this way, the conveyor may be conveniently located to receive feed from a supply source. It is essential however, that the discharge end of the conveyor be located above and in register with the hammerhill hopper regardless of the position of the conveyor.

On certain occasions, the machine operator wants to hammermill the feed as described and then deposit the feed in the mixing tank. On other occasions, where corn kernels are to be placed in the mixing tank and the corn supply comprises unshelled corn, the operator will want to have the corn by-pass the hammermill and go through a sheller to remove the kernels from the cobs, after which the kernels only will be conveyed to the tank. To simplify the overall structure of the machine, it is desirable to have the conveyor which feeds the hammermill hopper also feed the sheller but without impairing the swinging mounting of the conveyor.

One object of this invention is to provide, in a machine of the character described, a feeder unit constructed according to this invention and operable selectively to have feed deposited in a hammermill hopper or to by-pass the hopper and be deposited in a second feed processing device.

Another object of this invention is to provide, in apparatus of the character described, a feeder unit so constructed that feed may by-pass a hammermill and be conveyed to a sheller without impairing the lateral swingability of a supply conveyor.

Another object of this invention is to provide, in feed handling apparatus of the character described, a feeder unit so constructed that the unit may be retracted and stored in an inoperative position without interfering with the other operative components of the machine.

A further object of this invention is to provide, in feed handling apparatus of the character described, a feeder unit which is relatively simply constructed whereby it may be manufactured and assembled at low cost.

Other objects of this invention will be apparent hereinafter from the specification and from the recital in the appended claims.

In the drawings:

FIG. 3 is an enlarged fragmentary side elevation of the feeder unit in the extended position of FIG. 1;

FIG. 4 is a plan view of FIG. 3;

FIG. 5 is a fragmentary view similar to FIG. 4 but showing the conveyor of the apparatus and a second section of the feeder unit swung ninety degrees;

FIG. 6 is a plan view of the feeder unit and showing the second section of the unit telescoped and retracted into a first section and the feeder unit as a whole adjusted to a storage position;

FIG. 7 is a perspective view of the second section of the feeder unit;

FIG. 8 is a vertical section taken generally on the line 8—8 of FIG. 3 looking in the direction of the arrow; and FIG. 9 is an enlarged vertical section taken on the line 9—9 of FIG. 3 looking in the direction of the arrows.

Figure 1:
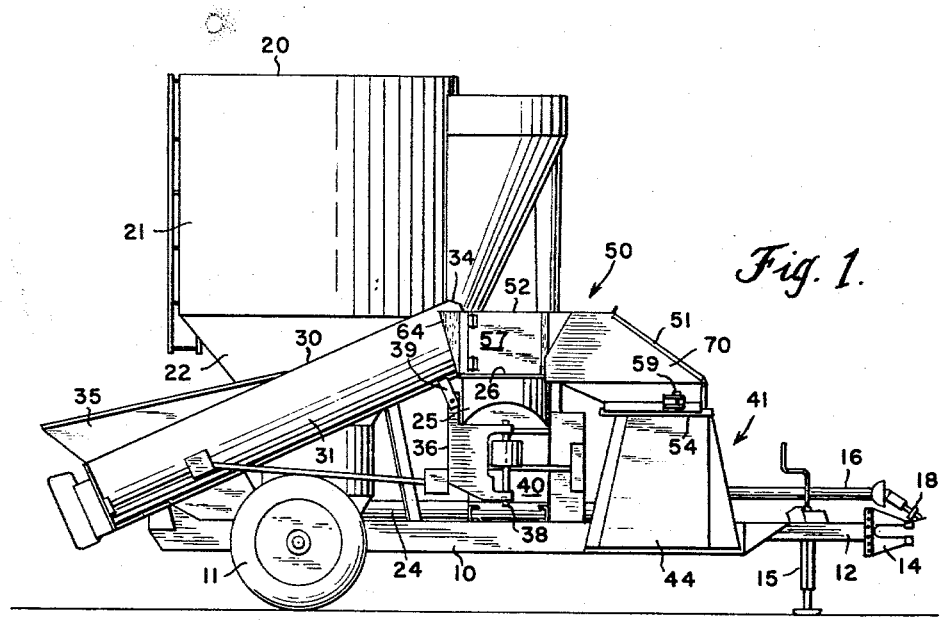
FIG. 1 is a side elevation of feed handling machine having a feeder unit constructed according to this invention and shown in extended position.
Figure 2:
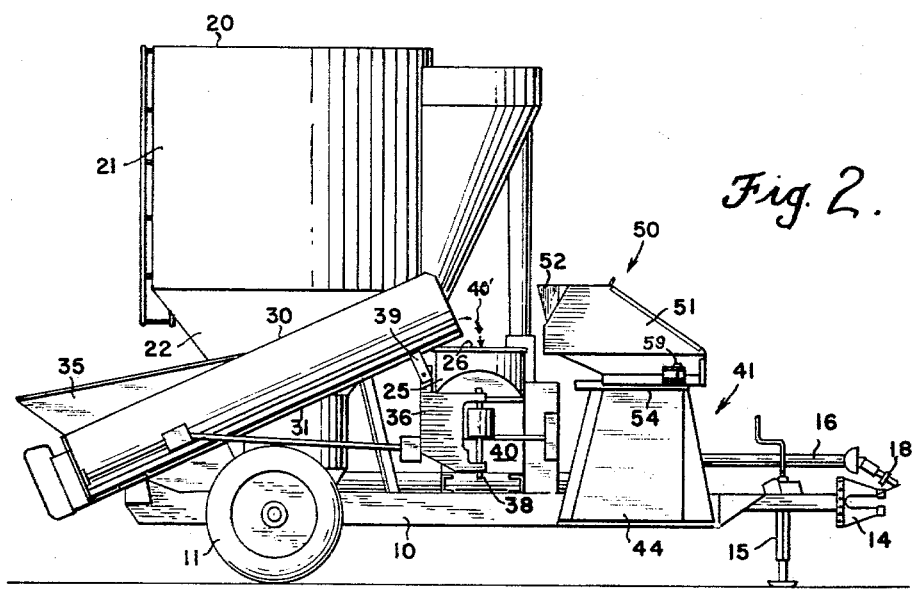
FIG. 2 is a view similar to FIG. 1 but showing the feeder unit retracted.

Referring now to the drawings by numerals of reference, and particularly to FIGS. 1 and 2, there is shown a machine for grinding, processing and mixing feed material comprising a horizontally extending frame 10 supported on rearwardly located ground wheels, one of which is shown at 11. Frame 10 has a forwardly projecting tongue 12 and a clevis 14 by which the implement may be connected to the drawbar of a tractor. When disconnected, the forward end frame 10 is supported on a jackstand 15. Power for operating the machine is derived from a power-take-off assembly 16 which extends above tongue 12 and is provided with a connection member 18 at its forward end.

Supported on frame 10 adjacent wheels 11 and extending upwardly is a large mixing tank 20 having a cylindrical upper section 21 and a cone shaped lower section 22. The bottom of the tank has a feed inlet, not shown, to which feed is supplied through a housing 24 in which an auger or other conveyor means is operable. Also mounted on frame 10 between wheels 11 and jackstand 15 is a hammermill hopper 25 having an infeed opening 26 at its top. Rearwardly of hopper 25 is an inclined conveyor 30 comprising a trough 31 in which an auger 32 (FIG. 3) is mounted and rotatable. One end 34 of trough 31 is located above and in discharge relation to hopper 25. The opposite end of the conveyor has guide plates 35 to direct supplied material into trough 31 so that it may be conveyed by the auger 32 toward the end 34 and dumped into hopper 25.

Conveyor 30 is normally disposed at one side of hopper 25 in the position shown in FIGS. 1-4. However, the conveyor is mounted to swing laterally outwardly relative to the frame 10 so that the lower inlet end of conveyor 30 may be located as desired relative to a supply source of feed material. To maintain the end 34 of the conveyor over hopper 25 regardless of the position of the conveyor, a bifurcated bracket 36 is provided and swingable on a vertical pivot shaft 38. An arm 39 pivotally interconnects bracket 36 and conveyor trough 31. Shaft 38 is beneath the opening 26 of hopper 25, the hopper bottom sloping downwardly and inwardly to provide room for the shaft. The register of the vertical axis of shaft 38 with the hopper insures that the end 34 of the conveyor will remain above the hopper regardless of its lateral position.

Hopper 25 guides and directs material to a hammermill contained in housing 40. Feed material coming from the conveyor 30 normally drops into the hopper as indicated by the arrows 40' in FIG. 2. After the material passes through the hammermill it is discharged into the conveyor housing 24 through which it is conveyed to the lower end of tank 20. An elevating auger, not shown, within tank 20 receives the material, elevates it and produces a homogeneous mass within the tank structure. The hammermill-tank-elevator relationship may be similar to that shown in U.S. Patent No. 2,815,-941.

Carried on frame 10 forwardly of hopper 25 is a feed processor 41 comprising a corn sheller 42 generally diagrammatically illustrated in FIGS. 3, 4 and 6. The feed processor includes a fixed frame 44 having a horizontal upper end 45 opened to receive feed material.

On some occasions, the operator of the machine wishes to deposit feed from the conveyor 30 and directly into the hopper 25. On other occasions, he wishes to have the material pass through the processor 41. Procesor 41 is used when the feed material is unshelled corn and the operator wishes to shell it and deposit only the corn kernels in tank 20. The feed processor discharges shelled corn to the same conveyor 24 which withdraws discharged material from the hammermill. To selectively discharge feed from conveyor 30 into hopper 25 or into feed processor 41, a feeder unit 50 is provided and comprising a first section 51 and a second section 52 telescopically related to the first section. The first section 51 mounts on top of frame 44 of the feed processor. Frame 44 is provided with a pair of fore-and-aft extending track members 54. As shown best in FIG. 9, the first section 51 of the feeder unit carries U-shaped side flanges 55 which engage the track members 54 for sliding movement thereon.

At a forward location along one of the tracks 54, a first hole 56 is provided and rearwardly thereof a second hole 58 is formed. The first section 51 of the feeder unit carries a bracket 57 and a vertically extending latch pin 59 which, when pushed through opening 56, latches feeder unit 50 in a retracted position as shown in FIG. 2 and when projected through the hole 58 latches the feeder unit in an extended position as shown in FIG. 1.

The extension the tracks 54 is such that feeder unit 50 may be moved toward or away from hopper 25. When moved toward the hopper and latched in place by projecting pin 59 through the opening 58, the second section 52 of the unit is adapted to be extended and pulled from first section 51 and positioned in closing relation to the hopper 25. The second section 52 is shown in perspective in FIG. 7, and comprises a fixed bottom plate 60 having a downwardly projecting flange 61 (FIG. 8) which fits into the opening 26 of hopper 25. When the section 52 of feeder unit 50 is in extended, closing position relative to the hopper, plate 60 remains in a fixed location relative to the hopper. However, the remainder of the second section of the feeder unit is pivotal about a vertical axis relative thereto. Pivotally carried on plate 60 is bottom member 62 having a downwardly extending sleeve 63 which projects through plate 60. Extending upwardly from opposite sides of member 62 are fixed wing members 64 and 65 which are located and so spaced apart that the upper end 34 of conveyor 30 projects between them. These wing members are interconnected by a U-shaped bracket 66 which extends upwardly from bottom member 62 and provides a cradle for conveyor 30. Extending from wing members 64 and 65 are pivoted gates 67 and 68, respectively.

When conveyor 30 extends fore-and-aft, in the position shown in FIGS. 1, 2 and 3, gate 67 engages a side wall 70 of the first section 51 of feeder unit 50 while gate 68 engages a side wall 71. Unshelled corn coming from conveyor 30 slides over bottom member 62 and passes between wings 64 and 65 and gates 67 and 68 of feeder unit second section 51. Then the corn passes between side plates 70 and 71 for first section 51 and down inclined base plate 73 to the feed processor 41.

The axis of sleeve 63 is coaxial with vertical shaft 38 which supports the end 34 of conveyor 30. When the conveyor 30 is swung laterally from its normal position as shown in FIGS. 1-4 to a location ninety degrees therefrom as shown in FIG. 5, section 52 of the feeder unit swings on the bottom plate 60. Wing member 65 becomes transversely located to guide the corn as it comes from conveyor 30 and to direct it around toward the gate 68. In cooperation, wing 65 and gate 68 cause the corn to turn ninety degrees and travel into feeder unit section 51 and then into the feed processor.

With this arrangement, conveyor 30 may be positioned as shown in FIG. 1 or in the location shown in FIG. 5 ninety degrees therefrom or at any location intermediate these positions. The construction of feeder unit 50 is such that when the unit is in extended position, feed will be guided to feed processor 41 regardless of the lateral position of the conveyor since the second section 52 of the feeder unit swings with the conveyor and continues to guide the material.

When the operator does not wish to use sheller 41, he merely lifts flange 61 from hopper 25 and slides the second section 52 of the feeder unit into the first section 51. Section 52 is telescoped into section 51 as shown in FIGS. 2 and 6. To further remove feeder unit 50 so as to not impair the passage of material directly into hopper 25, the feeder unit as a whole is moved forwardly by first withdrawing pin 59 from the hole 58 then sliding the unit along tracks 54 and then dropping pin 59 into opening 56. The feeder unit is then in locked, storage location as shown in FIG. 2, ready for use when needed.

It is thus seen that feeder unit 50 is extendible to an operative position as shown in FIG. 1 and retractable to an inoperative position as shown in FIG. 2. When extended, the feeder unit closes off hammermill hopper 25 but does not prohibit lateral swinging movement of conveyor 30 relative to the hopper. Since the pivot axis of the second section 52 of the feeder unit is coaxial with the vertical swinging axis of conveyor 30, the feeder section and conveyor remain in proper relation to each other when the conveyor 30 is swung laterally.

The structure described enables the operator to move feed material directly through the hammermill 40 to mixing tank 20 or to by-pass the hammermill and have the feed pass through the processor in the form of sheller 41. By merely extending the feeder unit 50, the operator can conveniently use processor 41 and when he wishes to use the hammermill alone, he merely retracts the feeder unit. The structure involved is relatively simple and low cost. Nevertheless substantial versatility in operation is provided.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention what I claim is:

1. Feed handling apparatus comprising, in combination, a hopper having a top opening, a conveyor having an end above said opening and in discharge relation to said hopper, said conveyor normally being located at one side of said hopper, means supporting said conveyor for lateral swinging movement from said normal location while maintaining said end in said discharge relation to said hopper, a feed processor located generally along a side of said hopper opposite said one side, a feeder unit having a first section connected to said processor and a second section extendible and retractable relative to the first section, said second section comprising a bottom plate which closes said hopper opening when the second section is extended and having guide means pivotally supported on said plate and connected to said conveyor to direct feed from the conveyor to said processor, said guide means being movable with said conveyor and relative to said bottom plate when the conveyor is swung laterally, and said second section when retracted permitting free discharge of feed from said conveyor to said hopper.

2. Feed handling apparatus as recited in claim 1 wherein said conveyor is swingable about a vertical axis, and the pivot of said guide means being located on said vertical axis.

3. Feed handling apparatus as recited in claim 1 wherein said guide means comprises a pair of gates extending upwardly from opposite sides of said bottom plate, means supporting each gate on said second section for swinging movement relative thereto about vertical axes.

4. Feed handling apparatus as recited in claim 3 wherein said conveyor is swingable in the range of about ninety degrees from said normal location, one of said gates having a guide wall extending therefrom to direct feed thereto when the conveyor is in a position away from said normal location.

5. Feed handling apparatus as recited in claim 1 wherein said second section of said feeder unit is telescopically received in said first section when the second section is retracted.

6. Feed handling apparatus as recited in claim 1 wherein said feeder unit first section is carried on a track on said feed processor and movable thereon between a first position toward said hopper and a second position away from the hopper.

7. Feed handling apparatus as recited in claim 6 wherein latch means is provided for holding said feeder unit first section in each of said positions.

8. Feed handling apparatus comprising, in combination, a hopper, a conveyor having an end in discharge relation to said hopper, said conveyor normally being located at one side of said hopper, means supporting said conveyor for lateral swinging movement from said normal location while maintaining said end in said discharge relation to the hopper, a feed processor located along a side of said hopper opposite said one side, a feeder unit having a first section connected to said feed processor and a second section extendible and retractable relative to the first section, said second section when retracted permitting free discharge of feed from the conveyor to said hopper and when extended having a member closing said hopper and providing guide means connected to said conveyor to direct discharged feed to said processor, and pivot means connecting said second section relative to said hopper when the feeder unit is extended whereby the second section is swingable relative to the hopper with said conveyor.

9. Feed handling apparatus comprising, in combination, a hopper, a conveyor having an end in discharge relation to said hopper, said conveyor normally being positioned in a given location at one side of said hopper, means supporting said conveyor for lateral swinging movement from said normal location while maintaining said end in discharge relation to said hopper, a feed processor located generally along a side of said hopper opposite said one side, an extendible and retractable feeder unit interposed between said feed processor and said hopper, said feeder unit when retracted permitting free discharge of feed from said conveyor to said hopper and when extended having means closing said hopper and providing means connected to said conveyor to guide the feed discharged therefrom to said feed processor, and means providing a pivotal connection between said feeder unit and said hopper when the unit is extended whereby a portion at least of the feeder unit is swingable relative to the hopper with said conveyor.

10. Feed handling apparatus comprising, in combination, a mobile frame, a mixing tank, a hammermill and a sheller carried, respectively, on said frame, means connecting said hammermill and sheller to said tank whereby feed discharged from either is deposited in the tank, a hopper for delivering feed to said hammermill, said hopper having a top opening, a conveyor having an end above said opening and in discharge relation to said hopper, said sheller being located at one side of said hopper and said conveyor normally being located generally along the opposite side of the hopper, means supporting said conveyor on said frame for lateral swinging movement from said normal location, said conveyor being swingable about a vertical axis in register with said hopper whereby said conveyor end is maintained in discharge relation to the hopper opening, a feeder unit having a first section and a second section extendible and retractable relative to the first section, a track on said sheller, said feeder unit first section being slidably supported on said track for movement between a first position toward said hopper and a second position away from the hopper, latch means for locking said first section in both of said positions, said second section having a bottom plate which closes said hopper opening when the second section is extended, guide means supported on said bottom plate for pivoting movement about an axis common with said vertical axis, means connecting said guide means to said conveyor end whereby when the conveyor is swung laterally said section is pivoted therewith, said guide means directing feed from said conveyor, to said first section, and then to said second section and said sheller when said second section is extended, and said second section when retracted and with the first section adjusted away from said hopper permitting free discharge of feed from said conveyor to the hopper.

References Cited by the Examiner
UNITED STATES PATENTS

| | | | |
|---|---|---|---|
| 1,800,920 | 4/31 | Wilson et al. | 193—23 X |
| 2,833,485 | 5/58 | Rothhaar | 241—186 X |

J. SPENCER OVERHOLSER, *Primary Examiner.*